United States Patent [19]
Blair

[11] 3,826,315
[45] July 30, 1974

[54] TILLAGE APPARATUS

[76] Inventor: Calvin B. Blair, P.O. Box 76, Barnard, Kans. 67418

[22] Filed: Jan. 19, 1973

[21] Appl. No.: 325,176

[52] U.S. Cl.................. 172/514, 172/166, 172/508
[51] Int. Cl...................... A01b 17/00, A01b 49/02
[58] Field of Search ........... 172/149, 166, 180, 508, 172/514–516; 56/314, 315, 316

[56] References Cited
UNITED STATES PATENTS

| | | | |
|---|---|---|---|
| 1,148,428 | 7/1915 | Barnes | 172/180 X |
| 1,261,150 | 4/1918 | Mountjoy | 172/515 |
| 1,445,705 | 2/1923 | Nuernberger | 172/514 |
| 1,565,676 | 12/1925 | Sandman | 172/514 |
| 2,050,943 | 8/1936 | Gebhardt | 172/514 X |
| 3,752,238 | 8/1973 | Chilton | 172/180 |

FOREIGN PATENTS OR APPLICATIONS

| | | | |
|---|---|---|---|
| 602,391 | 5/1948 | Great Britain | 172/515 |

Primary Examiner—Robert E. Pulfrey
Assistant Examiner—Paul T. Sewell
Attorney, Agent, or Firm—Fishburn, Gold & Litman

[57] ABSTRACT

Soil management apparatus combines pointed tillage tools with forwardly positioned, swingable rolling disc cutters which are preceded by elongated deflector bars projecting transversely and angularly across the anticipated path of the disc cutters for deflecting upwardly projecting stubble and the like laterally downwardly into the disc cutter path.

10 Claims, 4 Drawing Figures

PATENTED JUL 30 1974 3,826,315

TILLAGE APPARATUS

This invention relates to soil tillage apparatus and more particularly to tractor drawn devices adapted to reduce the number of passes through a field for optimum crop production with minimum soil loss.

It has been common practice to utilize a mold board plow which completely turns and exposes the undersoil for burying trash and stubble left from a harvested crop in preparation for later replanting. This tends to produce unwanted compaction and, further, leaves the surface exposed to water and wind erosion. Leaving trash and stubble on the soil surface is effective in reducing wind and water erosion, however, it is incompatible with seed bed preparation. Also, the use of discs and chisel plows are often not effective in bringing down upwardly projecting stalks, and the like, causing serious problems during planting and subsequent cultivation.

This invention provides tillage apparatus which utilizes structure for laying upwardly projecting trash and stubble into the path of disc cutters where they are cut into manageable lengths and subsequently mixed into the soil near the surface by chisel plows, thereby producing optimum conditions for erosion prevention as well as later seed bed preparation.

The principal objects of the present invention are: to provide tillage apparatus operable to reduce the number of passes through the field heretofore required for optimum soil conditioning; to provide such apparatus which produces a minimum of soil compaction; to provide such apparatus which cuts crop residue into manageable size and mixes same into the soil near the surface for maximum erosion protection while promoting trash disintegration; to provide such tillage apparatus which utilizes deflector bars positioned in front of cutter discs for laying down trash and stubble into the path of following rolling disc cutters; to provide such apparatus wherein the disc cutters are swingably mounted on the structure supporting the deflector bars thereby being less subject to damage and requiring substantially less pulling and turning force in the field; to provide such apparatus wherein the disc cutters are not subject to fouling by the accumulation of mud and trash between discs, and to provide such apparatus which is relatively simple and inexpensive in construction and yet extremely well suited for its intended purpose.

Other objects and advantages of this invention will become apparent from the following description taken in connection with the accompanying drawings wherein are set forth by way of illustration and example certain embodiments of this invention.

Figure 1:
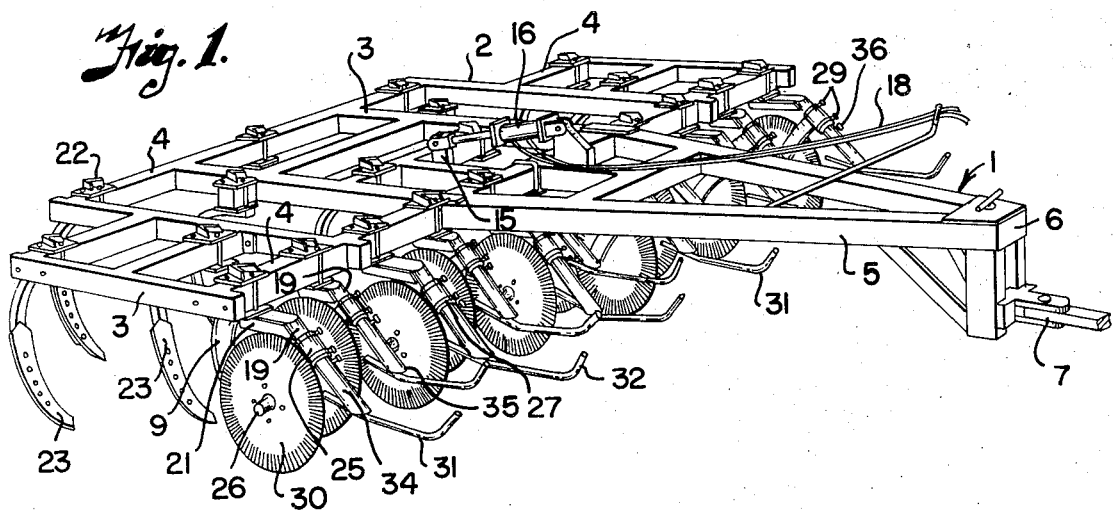
FIG. 1 is a perspective view of soil tillage apparatus embodying this invention.

Referring to the drawings in more detail:

The reference numeral 1 generally indicates soil tillage apparatus embodying this invention. The apparatus 1 comprises a rigid frame 2 having a plurality of longitudinal structural members 3, transverse structural members or plow beams 4 and a forwardly projecting tongue 5 terminating in a front end 6. The front end 6 includes a suitable tractor connecting device 7 by which the apparatus may be pulled through the field. A typical leveling device 8 is provided at the front end 6 to compensate for the different heights of various tractor hitches.

Figure 2:
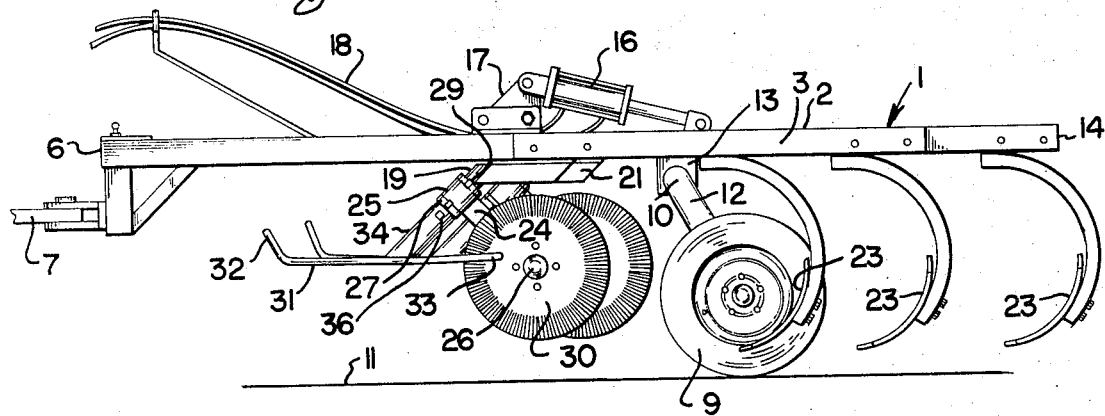
FIG. 2 is a side elevation thereof.

The frame 2 extends generally horizontally rearwardly from the front end 6 and is adapted to be drawn over the highway for transportation and through the field during operation on vertically adjustable wheels 9 (FIG. 2) mounted on the frame by structure 10. The wheel mount structure 10 controls the distance between the soil 11 and the tillage tools, described below, and includes arms 12 mounting the wheels 9 at one end thereof and being pivotally mounted in a bracket 13 at the other end, the bracket 13 being fixed to the frame 2 intermediate the front end 6 and the rear end 14. The arms 12 are fixed to an upwardly projecting lever 15 (FIG. 1) which is pivotedly connected to one end of a suitable hydraulic cylinder 16 having the other end fixed to the frame 2 by means of a bracket 17. The extension and retraction of the cylinder 16, through the conventional use of hydraulic fluid flowing through hoses 18, causes the pivoting of the wheel mounting arms 12, thereby raising and lowering the frame 2 with respect to the surface of the soil 11.

Figure 4:
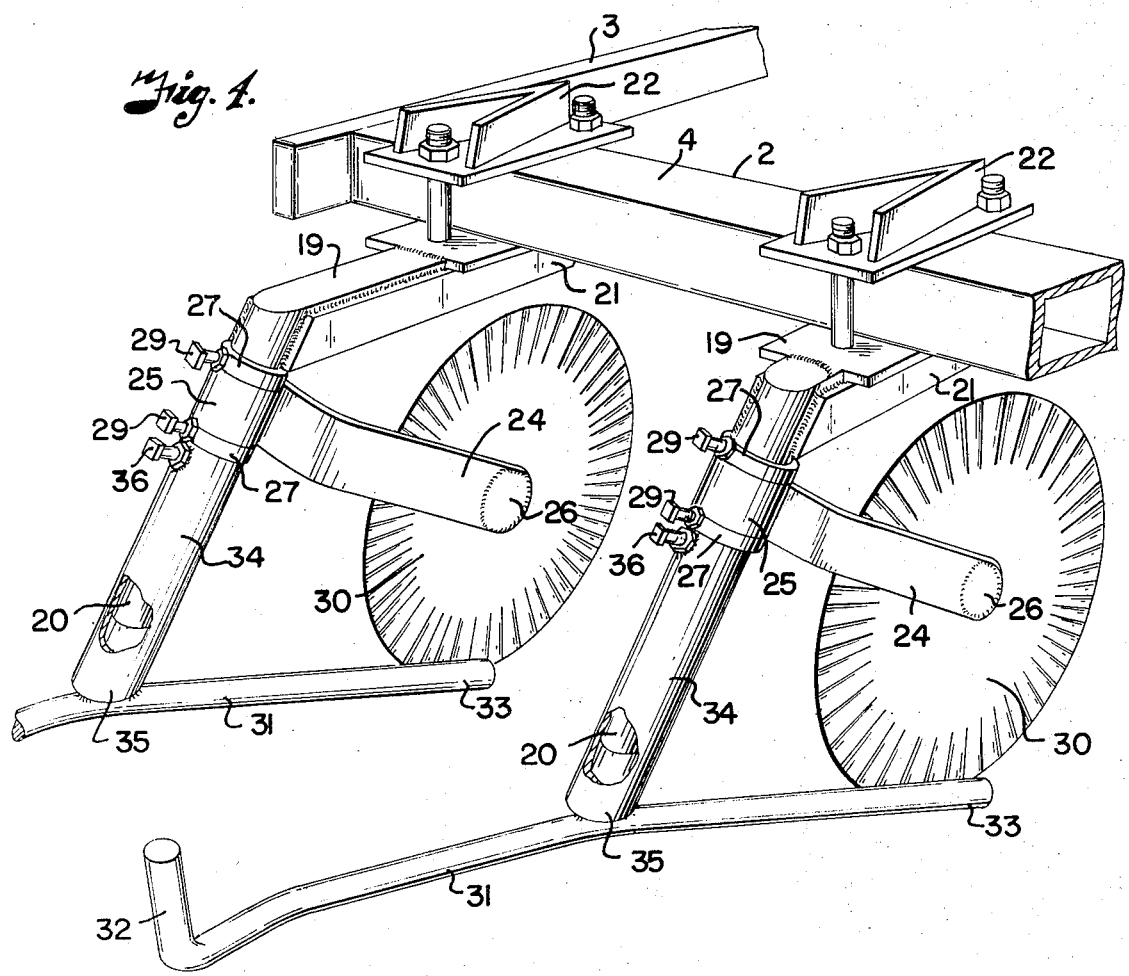
FIG. 4 is a fragmentary perspective view on an enlarged scale showing details of the deflector bar and disc cutter assemblies.
Figure 3:
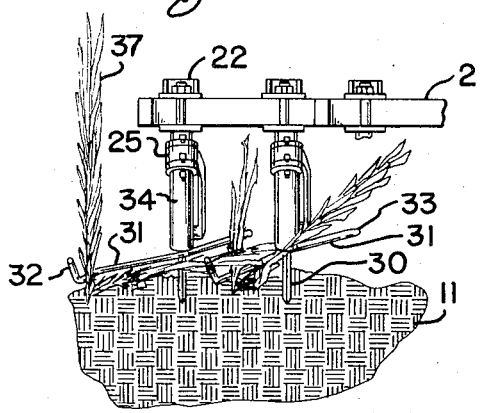
FIG. 3 is a fragmentary front elevation particularly showing the deflector bars and cutters in field operation.

A plurality of rigid support arms 19 respectively have a front rod portion 20 and a mounting rear portion 21 and project both forwardly and downwardly of the frame 2 (FIG. 4). Clamping members 22 secure the support arms 19, by the rear portions 21, in laterally spaced relation to a forward transverse beam 4 of the frame 2. The support arms 19 are positioned forwardly of respective, downwardly directed, curved, pointed tillage tools or chisel plows 23 mounted in alternate rows intermediate and rearwardly of the frame 2 on rearwardly spaced transverse beams 4.

A plurality of disc arms 24 respectively have a front portion forming a collar 25 and a rear portion terminating in a bearing mount 26. The collars 25 respectively surround and are pivotally engaged with one of the support arms 19 intermediate the support arm front and rear portions 20 and 21. The collars 25 are located between spaced positioning rings 27 which are adjustably fixed in position by means of suitable set screws 29. The support arm front portions project forwardly and downwardly of the frame 2 at an angle of approximately 45 degrees and the disc arms 24 project downwardly and rearwardly from the support arm front portions 20 also by approximately 45 degrees, the latter having a rolling disc cutter 30 engaged in the usual manner with the bearing mount 26.

The support arm rear portions 21 are alternately of longer and shorter length whereby adjacent disc cutters 30 are not aligned, thus substantially reducing the tendency to pick up clumps of coil and crop residue therebetween. Further, the swinging or pivotal mounting of the disc arms 24 aid in this function as well as reducing the likelihood of damage in case a hard object is struck and the turning force required for the apparatus in the field.

A plurality of elongated deflector bars 31 respectively have front ends 32 and rear ends 33. A sleeve 34 has a lower end 35 fixed, as by welding, to the deflector bars 31 intermediate the ends 32 and 33, and an upper end telescoped over the support arm front portions 20 as best illustrated in FIG. 4. A lock screw 36 extends into the sleeves 34 and bears against the support arm front portions 20 for adjustably fixing the sleeve in position on the front portions 20. The sleeves 34 thereby locate the deflector bars projecting in the best position transversely and angularly across the anticipated path of the disc cutters for deflecting upwardly projecting trash and stubble 37 and the like transversely downwardly so that it is cut by the forwardly rolling discs 30.

Thus, by the structure above described, the trash and stubble are chopped into pieces of suitable size so that the trailing chisel plows 23 mixes them with the upper soil. This provides optimum ground coverage for minimal wind and water erosion and yet promotes the disintegration thereof in anticipation of subsequent seed bed preparation and crop planting.

It is to be understood that while certain embodiments of this invention have been illustrated and described, it is not to be limited thereto except insofar as such limitations are included in the following claims.

What I claim and desire to secure by Letters Patent is:

1. Soil tillage apparatus comprising:
   a. a frame having a tractor-connecting front end and extending rearwardly therefrom, wheels mounted on said frame for rolling support thereof, a plurality of tillage tools mounted on said frame and projecting toward the soil,
   b. a plurality of rigid support arms mounted on said frame in laterally spaced relation, a plurality of disc arms respectively having a front portion pivotally mounted on one of said support arms and a rear portion; said disc arms projecting rearwardly of said support arms and having rolling disc cutters engaged therewith at said disc arm rear portions,
   c. a plurality of elongated deflector bars respectively having a front end and a rear end, and means mounting said deflector bars intermediate the ends of said deflector bars to said support arms with said deflector bars projecting transversely and angularly forward to rear across the normal path of said disc cutters and overlapping the adjacent deflector bar for deflecting upwardly projecting stubble and the like transversely downwardly into said cutter path.

2. The soil tillage apparatus as set forth in claim 1 wherein:
   a. means are provided for adjusting said wheels vertically with respect to said frame.

3. The soil tillage apparatus as set forth in claim 1 wherein:
   a. said tillage tools are fixed, pointed chisel type ploughs.

4. The soil tillage apparatus as set forth in claim 1 wherein:
   a. said support arms project forwardly and downwardly of said frame at an angle of approximately 45 degrees from the horizontal.

5. The soil tillage apparatus as set forth in claim 1 wherein:
   a. said support arms are of varying length whereby said disc cutters are not transversely aligned.

6. The soil tillage apparatus as set forth in claim 1 wherein:
   a. said disc arms project rearwardly and downwardly of said support arms at an angle of approximately 45 degrees from the horizontal.

7. The soil tillage apparatus as set forth in claim 1 wherein:
   a. said deflector bar mounting means comprises elongated sleeves receiving said support arms thereinto.

8. Soil tillage apparatus comprising:
   a. a frame,
   b. a plurality of disc cutters mounted on said frame for rolling contact with the soil, and
   c. stubble deflecting means mounted on said frame and projecting angularly forward to rear across the normal paths of said disc cutters and overlapping the adjacent deflecting means, and deflecting upstanding materials downwardly across the paths of said cutters.

9. The soil tillage apparatus as set forth in claim 8 wherein:
   a. said disc cutters are swingably mounted with respect to said deflecting means.

10. The soil tillage apparatus as set forth in claim 8 wherein:
    a. said deflecting means are elongated bars.

* * * * *